United States Patent
Kubota

(10) Patent No.: US 6,878,317 B2
(45) Date of Patent: Apr. 12, 2005

(54) INJECTION MOLDING MACHINE, HYDRAULIC ACTUATING MECHANISM OF INJECTION MOLDING MACHINE, AND CONTROL METHOD THEREFOR

(75) Inventor: Koji Kubota, Nagoya (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 194 days.

(21) Appl. No.: 10/136,523

(22) Filed: May 2, 2002

(65) Prior Publication Data

US 2003/0042640 A1 Mar. 6, 2003

(30) Foreign Application Priority Data

Aug. 30, 2001 (JP) ........................................ 2001-260696

(51) Int. Cl.⁷ .............................................. B29C 45/82
(52) U.S. Cl. .................. 264/40.1; 264/328.1; 425/135; 425/161; 425/166; 425/589; 425/591
(58) Field of Search ............................. 264/40.1, 328.1; 425/589, 591, 135, 161, 166

(56) References Cited

U.S. PATENT DOCUMENTS

| | | | | |
|---|---|---|---|---|
| 5,052,909 A | * | 10/1991 | Hertzer et al. ............... | 425/150 |
| 5,486,106 A | * | 1/1996 | Hehl .......................... | 425/145 |
| 5,580,585 A | | 12/1996 | Holzschuh | |
| 5,634,334 A | | 6/1997 | Hehl | |
| 6,280,170 B1 | * | 8/2001 | Furuya et al. ............... | 425/145 |
| 6,379,119 B1 | * | 4/2002 | Truninger .................... | 264/40.1 |
| 6,478,572 B1 | * | 11/2002 | Schad ......................... | 425/145 |

FOREIGN PATENT DOCUMENTS

| | | |
|---|---|---|
| DE | 43 35 328 | 4/1995 |
| DE | 295 04 809 | 6/1995 |
| EP | 0 464 286 | 1/1992 |
| JP | 3038122 | 2/2000 |
| WO | WO 97/05387 | 2/1997 |

OTHER PUBLICATIONS

Patent Abstracts of Japan, JP 60–176737, Sep. 10, 1995.

* cited by examiner

*Primary Examiner*—Jill L. Heitbrink
(74) *Attorney, Agent, or Firm*—Oblon, Spivak, McClelland, Maier & Neustadt, P.C.

(57) ABSTRACT

The present invention provides a hydraulic actuating mechanism of an injection molding machine, in which a plurality of hydraulic actuators are driven by one hydraulic pump, wherein the hydraulic pump of the hydraulic actuating mechanism is a variable discharge pump having the maximum necessary delivery capacity at least for each of the hydraulic actuators at the time of the highest rotational speed of the pump; the discharged fluid pressure is controlled by a discharge cutoff function of a pressure compensator ancillary to the variable discharge pump; and the pump is driven by a motor whose rotation can be controlled in a stepless mode.

13 Claims, 4 Drawing Sheets

INJECTION MOLDING MACHINE, HYDRAULIC ACTUATING MECHANISM OF INJECTION MOLDING MACHINE, AND CONTROL METHOD THEREFOR

BACKGROUND OF THE INVENTION AND RELATED ART STATEMENT

1. Field of the Invention

The present invention relates to a hydraulic actuating mechanism and, more particularly, to a hydraulic actuating mechanism aiming at energy saving in each hydraulic actuator and a control method therefor.

2. Description of Related Art

A hydraulic die clamping mechanism, which is one of hydraulic actuating mechanisms having been used for a conventional injection molding machine, requires a strong force for die clamping, so that the hydraulic cylinder must have a large diameter, which requires a large amount of hydraulic oil. A hydraulic power source consisting of a hydraulic pump of a constant speed (1200 to 1800 rpm) used for an ordinary hydraulic system is configured so as to deliver the required highest oil pressure and flow rate, and surplus hydraulic oil is returned to an oil tank through a relief valve. Therefore, a great energy loss is yielded.

In order to reduce such an energy loss, some hydraulic systems use a variable flow rate pump. However, the pump of this type produces high noise at the time of constant-speed operation (1200 to 1800 rpm). To solve the above problems, U.S. Pat. No. 3,038,122 has proposed a hydraulic actuating mechanism having a fixed delivery hydraulic pump driven by a variable speed electric motor and a plurality of hydraulic driving mechanisms, wherein the fixed delivery hydraulic pump is a steady feed pump capable of delivering a flow rate and a hydraulic pressure corresponding to the maximum consumption of at least all of the hydraulic driving mechanisms, the rotational speed of the electric motor can be controlled in proportion to the consumption and/or consumed pressure of hydraulic driving mechanisms in operation, and the ramp gradient of change in rotational speed can be controlled by a program incorporated in a controller section.

For an AC inverter motor used for the hydraulic actuating mechanism described in U.S. Pat. No. 3,038,122, acceleration and deceleration of pump are slow due to the inertia of rotor of the motor, so that control such as to increase the speed of an actuator for starting and stopping is difficult to carry out (No matter how fast a change in frequency of inverter may be, it is difficult to follow up the acceleration of motor). Therefore, the position control of a functional part moved by a hydraulic actuator is liable to delay, which presents a problem of overrun. Also, in order to carry out pressure control at the rotational speed of pump, each of the hydraulic driving mechanisms requires a detector for pressure, which makes the hydraulic actuating mechanism expensive.

Also, a plurality of actuators are sometimes operated at the same time (the flow rate and pressure of the main actuator are determined, and for the other actuators, part of hydraulic fluid is branched and circulated, and the pressure is controlled by a pressure reducing valve and the flow rate is throttled by a flow controller). At this time, the discharge pressure of pump must be constant, so that it is necessary to provide a pressure detector at the discharge opening of pump.

OBJECT AND SUMMARY OF THE INVENTION

An object of the present invention is to provide a hydraulic actuating mechanism in which each actuator is controlled quickly, the position control is easy to carry out, the hydraulic circuit is simple, and even at various values of flow rate×pressure (energy for actuation) of hydraulic fluid, the efficiency of a hydraulic pump and a motor for driving the pump is increased.

To solve the above problems, the present invention provides measures featuring the construction and method described in the following items.

(1) In a hydraulic actuating mechanism of an injection molding machine, in which a plurality of hydraulic actuators are driven by one hydraulic pump, the hydraulic pump of the hydraulic actuating mechanism is a variable discharge pump having the maximum necessary delivery capacity at least for each of the hydraulic actuators at the time of the highest rotational speed of the pump; the discharged fluid pressure is controlled by a discharge cutoff function of a pressure compensator ancillary to the variable discharge pump; and the pump is driven by a motor whose rotation can be controlled in a stepless mode.

(2) In the hydraulic actuating mechanism of an injection molding machine described in item (1), the motor capable of controlling the rotation of the variable discharge pump in a stepless mode is an inverter controlled motor or an AC servomotor.

(3) In a control method for the hydraulic actuating mechanism described in item (1) or (2), the maximum load (flow rate×pressure) of the hydraulic actuator is controlled so as to match with a characteristic diagram in which flow rate×pressure of the variable discharge pump is constant.

(4) In a control method for the hydraulic actuating mechanism described in item (1) or (2), the fluid pressure cutoff control of the variable discharge pump is program control for operating a fluid pressure cutoff mechanism of the variable discharge pump by using a proportional pressure valve.

(5) In an injection molding machine, two or more of driving means including injection nozzle touching means, die clamping means, die opening/closing means, screw driving means, injecting means, and product ejecting means are driven hydraulically by using the hydraulic actuating mechanism described in item (1) or (2), and other driving means are driven electrically.

(6) In the injection molding machine described in item (5), the die opening/closing means, injecting means, and screw driving means are driven electrically.

(7) In a control method for the injection molding machine described in item (5) or (6), the maximum load (flow rate×pressure) of the hydraulic actuator is controlled so as to match with a characteristic diagram in which flow rate×pressure of the variable discharge pump is constant.

(8) In a control method for the injection molding machine described in item (5) or (6), the fluid pressure cutoff control of the variable discharge pump is program control for operating a fluid pressure cutoff mechanism of the variable discharge pump by using a proportional pressure valve.

In the hydraulic actuating mechanism of an injection molding machine in accordance with the present invention, as a hydraulic pump, the variable discharge pump having the maximum necessary delivery capacity for each of the hydraulic actuators is used, the discharged fluid pressure of the pump is controlled by a discharge cutoff function of the pressure compensator, and the pump is driven so that the rotation can be controlled in a stepless mode. Therefore, in the injection molding machine in which processes driven by hydraulic oil of the variable discharge pump are independent, if the oil pressure, flow rate, and operation timing necessary for each process are set by programming in advance, the control of hydraulic operation of the injection molding machine can be carried out only by direct program control of the variable discharge pump, and also the holding flow rate at the end of cylinder etc. can be cut off by the pressure compensator. Therefore, the relief valve is unnecessary, and thus energy loss in the hydraulic operation is low. Also, during the holding process, the rotational speed of the hydraulic pump is decreased and is controlled to a low-speed rotation, so that noise can be reduced through the whole work. Further, since the number of parts is small, the manufacturing cost is low, and since the electric energy for driving the hydraulic pump decreases, the running cost can also be reduced (claim 1).

If the motor for driving the variable discharge pump is an inverter controlled motor or an AC servomotor, at the time of high load as in the case of the hydraulic die clamping means and hydraulic injecting means, the motor is rotated at a high speed, and the highest operation efficiency can be obtained. Also, in the case of an actuator that has a low flow rate and is allowed to have a low discharge speed as in the case of the product ejecting means and hydraulic nozzle touching means, the rotational speed of the motor is decreased and the load on the pump is reduced, by which the operation is performed with frictional loss being reduced, which makes the operation efficient (claim 2).

Furthermore, in the above-described hydraulic actuating mechanism, if the discharge quantity and liquid pressure of the variable discharge pump are controlled according to the flow rate–pressure diagram matched with the load of hydraulic actuator on which the maximum load (flow rate× pressure) is imposed of the hydraulic actuators provided in the injection molding machine (method), an excessive load is not imposed on the pump driving motor and the variable discharge pump, so that the motor power need not have a margin, and the highest operation efficiency can be obtained (claims 3 and 7).

Also, if the fluid pressure cutoff control of the variable discharge pump is program control using the proportional pressure valve, in the program, an oil pressure best suited to each actuator can be selected (claims 4 and 8).

In the injection molding machine having a plurality of driving means, if the die clamping means, injection nozzle touching means, product ejecting means, and screw driving means are controlled by the above-described method as means using one variable discharge pump, and die opening/closing means, injecting means, and screw driving means are electrically driven mechanisms, an injection molding machine in which easy control can be carried out comprehensively, and the cost is low can be obtained (claims 5 and 6).

DETAILED DESCRIPTION OF PREFERRED EMBODIMENTS

[First Embodiment]

Figure 1:
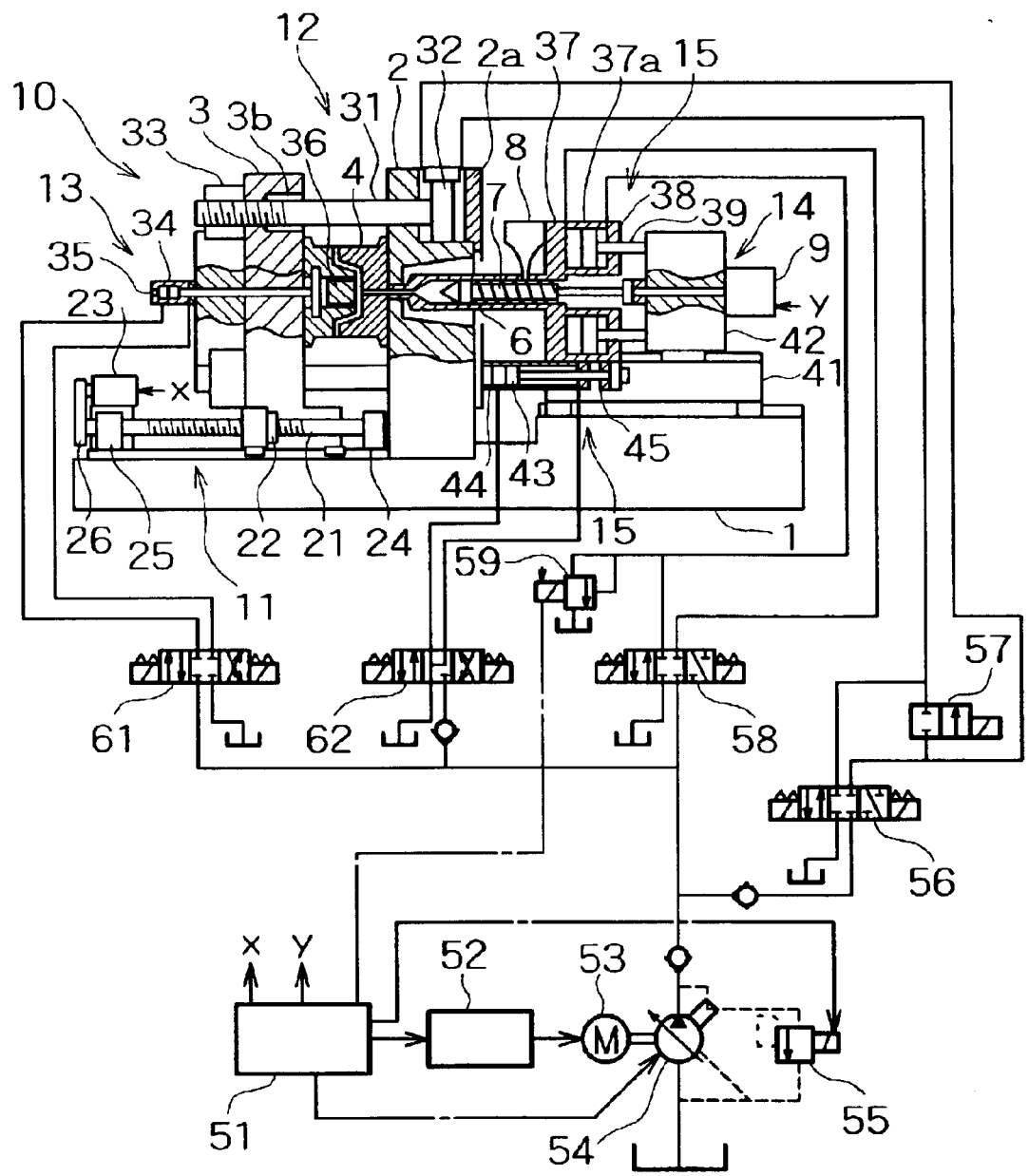
FIG. 1 is a partially sectioned side view showing a construction of an injection molding machine in accordance with a first embodiment of the present invention and a block diagram showing a control system for the injection molding machine.
Figure 2:
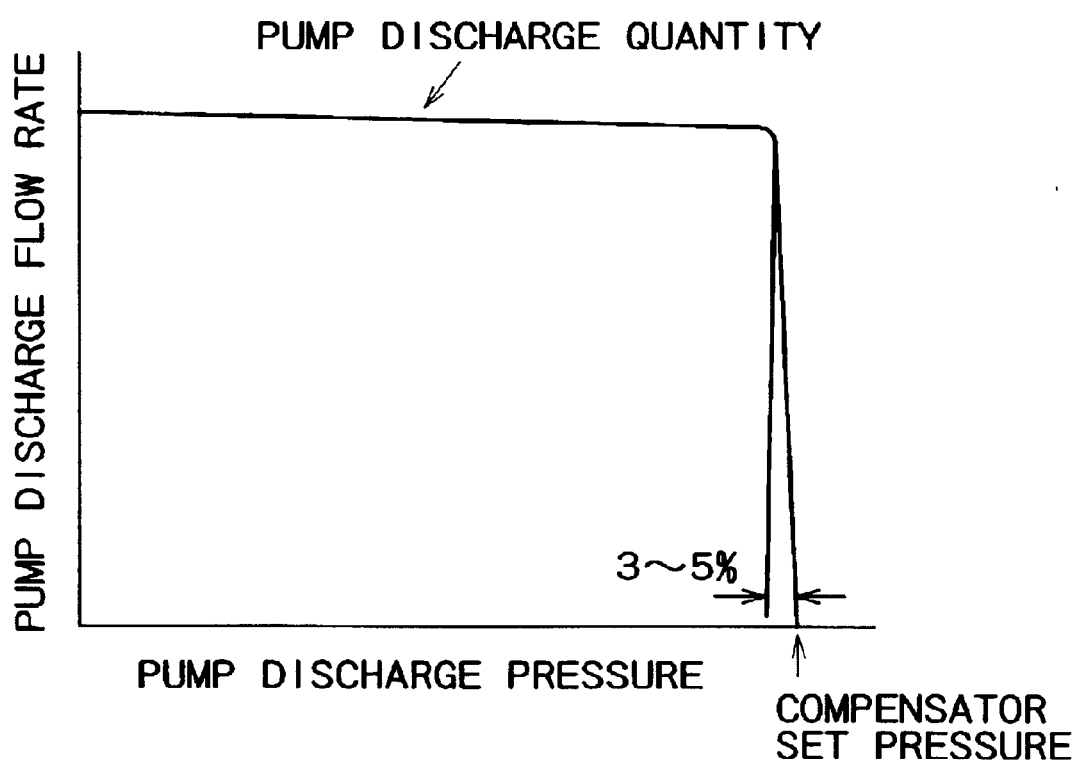
FIG. 2 is a diagram showing pressure-flow rate characteristics of control using a pressure compensator of a variable discharge pump provided in an oil pressure control system for the injection molding machine shown in FIG. 1.
Figure 3:
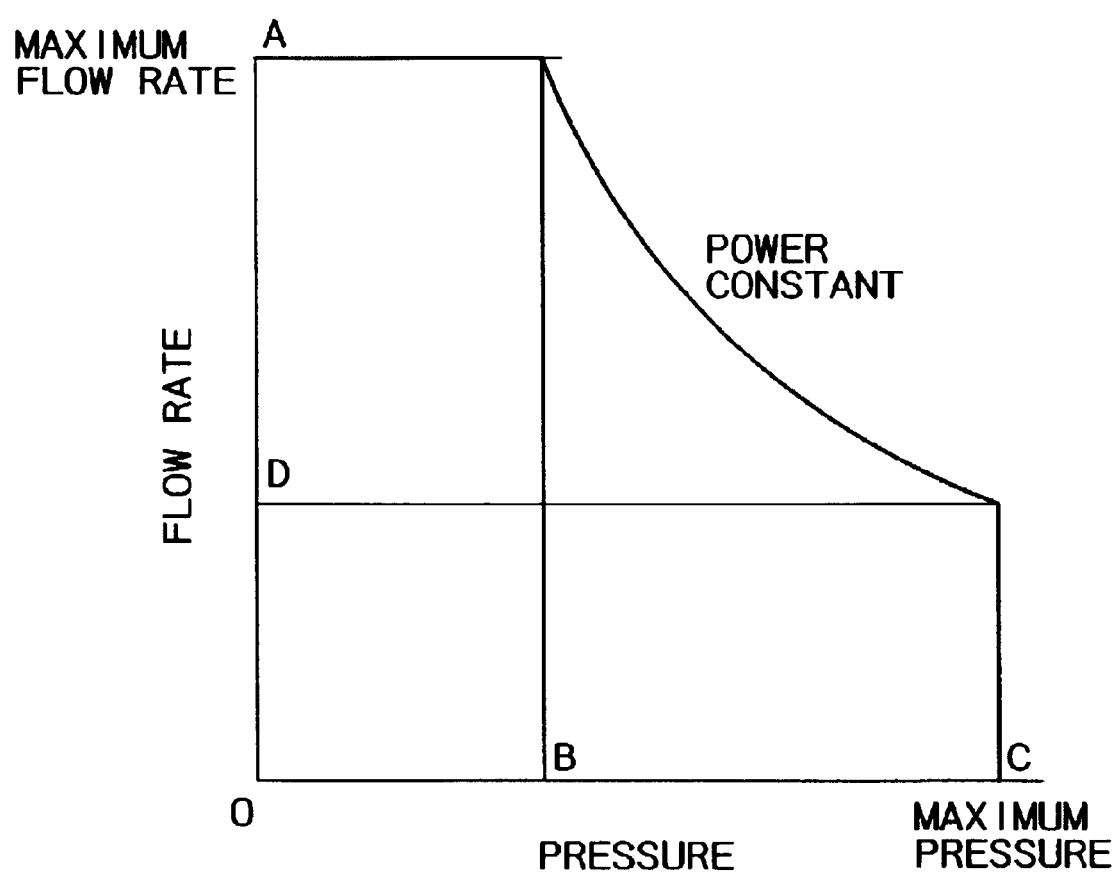
FIG. 3 is a diagram showing pressure-flow rate characteristics of power constant control using a variable discharge pump.

FIG. 1 is a partially sectioned side view showing a construction of an injection molding machine in accordance with a first embodiment of the present invention and a block diagram showing a control system for the injection molding machine, FIG. 2 is a diagram showing pressure-flow rate characteristics of control using a pressure compensator of a variable discharge pump provided in an oil pressure control system for the injection molding machine shown in FIG. 1, and FIG. 3 is a diagram showing pressure-flow rate characteristics of power constant control using a variable discharge pump.

An injection molding machine 10 shown in FIG. 1 mainly includes a fixed die plate 2 provided fixedly on a base 1, a fixed die 4 installed on the fixed die plate 2, a movable die plate 3 provided movably on the base 1 so as to face the fixed die plate 2, a movable die 5 installed on the movable die plate 3, tie bars 31 each inserted in an insertion hole 3b of the movable die plate 3 to connect the movable die plate 3 to the fixed die plate 2 at the time of die clamping, split nuts 33 each engaging with a plurality of ring grooves formed at equal intervals in the tie bar 31 to fix the tie bar 31 on the outside of the movable die plate 3, a unit transfer bed 41 provided movably on the base 1, an injection cylinder bed 37 integral with an injection cylinder 6 provided fixedly on the unit transfer bed 41, a screw driving motor bed 42 rotatably supporting an injection screw 7 while restraining it in the axial direction and movable on the unit transfer bed 41, and an injection screw driving servomotor 9.

Means for operating such main elements include electric die opening/closing means 11, hydraulic die clamping means 12, hydraulic product ejecting means 13, electric screw driving means 14, and hydraulic injecting means 15. As a hydraulic power source for supplying pressurized hydraulic oil to a hydraulic actuator, a variable discharge pump 54 having the maximum necessary delivery capacity at least for each of hydraulic actuators at the time of the highest rotational speed of pump is used. The discharged oil pressure of the pump 54 is controlled by a discharge cutoff function (of the characteristic curve shown in FIG. 2) of an ancillary pressure compensator 55. Moreover, the pump 54 is driven by an AC motor 53, and the rotational speed of the AC motor 53 is controlled by an inverter 52 so that the rotation control can be carried out in a stepless mode.

The electric die opening/closing means 11 is constructed so that the power of a servomotor 23 turns a ball screw shaft 21, which is supported on bearing beds 24 and 25 provided fixedly on the base 1, via a power transmitting mechanism 26, by which the movable tie plate 3 fitted with a ball screw nut 22 engaging threadedly with the ball screw shaft 21 is moved in the direction of die opening/closing operation. The servomotor 23 controls the movable die plate 3 so that the movable die plate 3 is accelerated slowly according to a die clamping transfer speed control program incorporated in a controller 51, and after being moved at a fixed speed, it is decelerated so as to stop just before the movable die 5 comes into contact with the fixed die 4.

For the hydraulic die clamping means 12, a hydraulic actuator is composed of a hydraulic die clamping cylinder 2a having a short stroke and a large diameter and a large-diameter piston 32 slidingly moving in the cylinder 2a. The die clamping cylinder 2a is provided in plural number (four in this embodiment) in the fixed die plate 2. The piston 32 is connected integrally with the tie bar 31. After the split nut 33 engages with the ring grooves formed at equal intervals in the tie bar 31, and thus the tie bar 31 is fixed on the outside of the movable die plate 3, a four-way switching valve 56 is switched. Thus, hydraulic oil is fed to the left-hand side in the figure of the die clamping cylinder 2a, by which the dies 4 and 5 are clamped. The die clamping oil pressure is determined by the maximum oil pressure of the variable discharge pump 54. The discharged oil pressure of the pump 54 is controlled by a discharge cutoff function (of the characteristic curve shown in FIG. 2) of the ancillary pressure compensator 55. In a proportional pressure valve incorporated in the pressure compensator 55, a set pressure for cutting off the flow rate is controlled by a command programmed by the controller 51.

After the die clamping operation, every port of the four-way switching valve 56 is closed to maintain the die clamping oil pressure in the die clamping cylinder 2a. At the time of die releasing after injection, pressure holding, and cooling processes have proceeded, a two-way switching valve 57 is opened at the same time that the four-way switching valve 56 is switched, and thus the same oil pressure acts on both sides of the piston 32, so that a die releasing force is created on the piston 32 by a difference in oil pressure actuating area (the oil pressure actuating area on the left-hand side of the piston 32 is smaller by the area of tie bar 31).

The hydraulic product ejecting means 13 is made up of a hydraulic cylinder 34, a piston 35, an eject bar 36, and the like. The hydraulic oil discharged from the variable discharge pump 54 is switched by a four-way switching valve 61 to operate the eject bar 36, by which a product is projected and taken out of the movable die 5.

The electric screw driving means 14 has the screw driving motor bed 42 rotatably supporting the injection screw 7 while restraining it in the axial direction. The screw driving motor bed 42 is mounted with the servomotor 9 directly connected to the injection screw 7, and via the servomotor 9 driven in accordance with an injection screw rotational speed control program incorporated in the controller 51, the rotational speed of the injection screw 7 is controlled. When the screw 7 turns and molten resin is plasticized, the molten resin accumulates at the tip end of the injection screw 7. The back pressure during the plasticization is controlled by a proportional pressure valve 59.

The hydraulic injecting means 15 has the injection cylinder bed 37 integral with the injection cylinder 6, and the injection cylinder bed 37 is provided with a pair of hydraulic cylinders 37a and hydraulic pistons 38 disposed in parallel symmetrically with respect to the central axis of the injection cylinder 6. By the operation of these hydraulic cylinders 37a and pistons 38, the injection screw 7 is driven in the linear direction via a piston rod 39 and the screw driving motor bed 42. Specifically, the hydraulic injecting means 15 is constructed so that the hydraulic oil discharged from the variable discharge pump 54 is switched by a four-way switching valve 58 according to an injection screw advance/retreat speed control program incorporated in the controller 51, and thus the rotational speed of the variable discharge pump 54 is regulated, by which the advance speed of the injection screw 7 is controlled.

Hydraulic nozzle touching means 16 is constructed so that by switching a four-way switching valve 62 from a state in which a nozzle of the injection cylinder 6 is separated from the fixed die plate 2, the hydraulic oil delivered from the variable discharge pump 54 is sent to a right-hand chamber of a hydraulic cylinder 43 in FIG. 1, a piston 44 is moved in the left direction, and a rod 45 draws the injection cylinder bed 37 to the left-hand side, by which the nozzle of the injection cylinder 6 is touched to the fixed die plate 2.

The following is a description of the relationship between each process of the injection molding machine 10 and each driving means.

The nozzle of the injection cylinder 6 is touched to the fixed die plate 2 by the nozzle touching means 16, and the oil pressure in the right-hand chamber of the hydraulic cylinder 43 is held in preparation for the injection process, by which work is started from a completely opened die state in which the movable die plate 3 lies at the retreat end.

By the rotation of the ball screw shaft 21 in the die closing direction, the movable die 5 and the movable die plate 3 move and stop just before the dies 4 and 5 come into contact with each other. After the tie bars 31 are restrained from coming out of the movable tie plate 3 by locking means such as the split nuts 33, hydraulic oil is fed into the hydraulic cylinder 2a to perform die clamping of the dies 4 and 5.

At the beginning of the die clamping process, the four-way switching valve 56 first opens a hydraulic oil supply pipe to the die clamping cylinder 2a, and the variable discharge pump 54 is started with the oil pressure and flow rate programmed in the controller 51 by a command of the controller 51 (at this time, the oil pressure is set at a die clamping pressure set value). When the hydraulic oil is sent into a left-hand chamber of the die clamping cylinder 2a in FIG. 1, the piston 32 moves to decrease a narrow gap between the dies 4 and 5, so that the dies 4 and 5 come into contact with each other, and thus the hydraulic oil is compressed, by which the pressure is increased. When the oil pressure reaches the die clamping pressure set value, the pressure compensator 55 acts on a discharge change mechanism (slant plate) of the variable discharge pump 54 while the oil pressure is maintained to carry out the cutoff control of flow rate. After the cutoff control, pressure oil of only a leak from the die clamping cylinder 2a has only to be supplied, so that the rotational speed of the variable discharge pump 54 is decreased to reduce electric power consumption and noise.

While all ports of the four-way switching valve 56 are closed, and the die clamping of the dies 4 and 5 is continued, the hydraulic injecting means 15 is operated to inject molten resin accumulating at the tip end of the injection screw 7 of the injection cylinder 6 into a cavity of the dies 4 and 5. The molten resin in the die cavity is cooled and solidified in a pressure holding state to form a product. During the time when the molten resin is solidified, the variable discharge pump 54 is in a stopped state while the oil pressure is held.

Next, the process proceeds to die releasing of the dies 4 and 5. In the die releasing of the dies 4 and 5, the four-way switching valve 56 is switched to the same switching position as that in the above-described die clamping process, and the two-way switching valve 57 is opened, by which the variable discharge pump 54 is operated with the flow rate programmed in the controller 51. The set oil pressure is applied to oil chambers on both sides of the piston 32 in the die clamping cylinder 2a, and the piston 32 is subjected to a force in the die releasing direction by a difference in oil pressure actuating area between the both sides of the piston 32, by which the fixed die 4 and the movable die 5 are released from each other. At this time, the hydraulic oil scarcely flows to the outside.

The locking means such as the split nuts 33 are operated reversely to lift the restraint of the tie bars 31 with respect to the movable die plate 3, and thus the movable die plate 3 is moved by the electric opening/closing means 11, by which the fixed die 4 and the movable die 5 are opened. After the dies 4 and 5 are opened fully, the product ejecting means 13 is operated hydraulically to project the eject bar 36, by which a product is taken out of the movable die 5. After the product is taken out, the next die closing operation starts.

In the case where the nozzle of the injection cylinder 6 is removed from the fixed die plate 2 to perform resin cleaning, resin replacement, die change, and the like operations after the operation of the injection molding machine 10 is finished, the hydraulic injection nozzle touching means 16 is operated reversely.

As described above, although the hydraulic operation of each process has an oil pressure holding process, all of the processes in which hydraulic oil is discharged and supplied are independent. Therefore, the variable discharge pump 54 is matched with the oil pressure and flow rate necessary for each of the processes, and the running hours and timing are set by programming in advance. By doing this, the hydraulic operation control of the injection molding machine 10 can be carried out only by direct program control of the variable discharge pump 54. Also, the flow rate of high pressure holding at the end of cylinder etc. can be cut off by the pressure compensator 55. Therefore, the relief valve is unnecessary, and energy loss in the hydraulic operation flow rate can be reduced. If the rotational speed of the variable discharge pump 54 is decreased during the high pressure holding, energy loss and pump noise can further be reduced.

When it is desired to use the capacity of the variable discharge pump 54 fully as in the case of the hydraulic die clamping means 12 and the hydraulic injecting means 15, the AC motor 53 is rotated at a high speed and the variable discharge pump 54 is driven at the usable limit output, and program control is carried out so that the pressure and flow rate along the power constant characteristic curve shown in FIG. 3 are obtained. By doing this, an excessive load is not imposed on the AC motor 53 and the variable discharge pump 54, and the highest operation efficiency can be obtained. Also, since the die releasing operation uses a low pressure and the highest flow rate, and the die clamp holding operation uses a high pressure and a low flow rate as in the range of A and C in FIG. 3, if the power is constant, a motor with a power lower than the power of highest pressure×highest flow rate can be selected.

In the case of an actuator that has a low flow rate and is allowed to have a low discharge speed as in the case of the hydraulic product ejecting means 13 and the hydraulic nozzle touching means 16, the rotational speed of the AC motor 53 is decreased and the load on the variable discharge pump 54 is reduced, by which the operation is performed with frictional loss being reduced, which makes the operation efficient.

[Second Embodiment]

Figure 4:
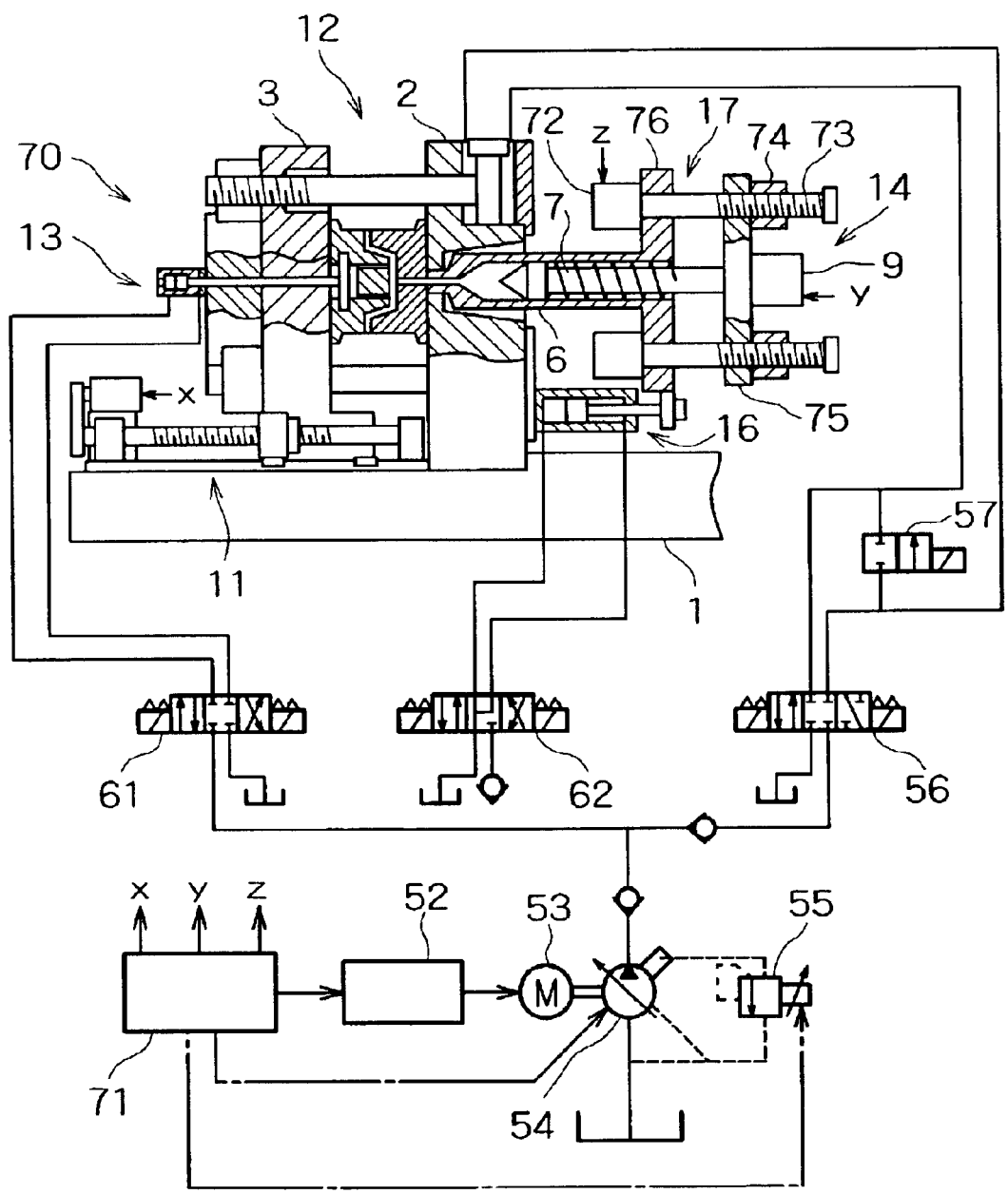
FIG. 4 is a partially sectioned side view showing a construction of an injection molding machine in accordance with a second embodiment of the present invention and a block diagram showing a control system for the injection molding machine.

FIG. 4 is a partially sectioned side view showing a construction of an injection molding machine in accordance with a second embodiment of the present invention and a block diagram showing a control system for the injection molding machine.

An injection molding machine 70 of the second embodiment uses electric injecting means 17 in place of the hydraulic injecting means 15 of the injection molding machine 10 in the first embodiment. The construction of the injection molding machine 70 is the same as that of the injection molding machine 10 shown in FIG. 1, so that the explanation of the construction and function of common portions is omitted. Since the injection molding machine 70 is not provided with the hydraulic injecting means 15, the four-way switching valve 58 is unnecessary.

The electric injecting means 17 has a pair of ball screw shafts 73 disposed symmetrically on both sides of the injection cylinder 6, and the paired ball screw shafts 73 are rotatably supported on an injection cylinder bed 76 while being restrained in the axial direction. Also, in the electric injecting means 17, a ball screw nut 74 engaging threadedly with the ball screw shaft 73 is installed to a screw driving motor bed 75, and the injection speed of the injection screw 7 is controlled by a controller 71 via a pair of servomotors 72 rotating synchronously that are installed on the injection cylinder bed 76.

In an actuating process to which the variable discharge pump 54 relates, since there is no hydraulic injecting means, a portion in which the timing of process overlaps is eliminated, so that it is necessary only that the variable discharge pump 54 be program controlled so that pressure and flow rate that are suited to the drive of each actuator are delivered.

What is claimed is:

1. An injection molding machine, comprising:
   electrically-driven die opening/closing means; and
   a hydraulic actuating mechanism including:
   a plurality of hydraulic actuators driven by one hydraulic pump, the hydraulic pump of said hydraulic actuating mechanism being a variable discharge pump configured to deliver a maximum necessary delivery capacity at least for each of said hydraulic actuators at the time of a highest rotational speed of said pump; and
   a plurality of four-way switching valves and at least one two-way switching valve provided between the variable discharge pump and said plurality of hydraulic actuators, the plurality of four-way switching valves and the at least one two-way switching valve being configured to control an operation of the plurality of hydraulic actuators,
   wherein the plurality of hydraulic actuators includes hydraulically-driven die clamping means, a discharged fluid pressure is controlled by a discharge cutoff function of a pressure compensator ancillary to said variable discharge pump, and said pump is driven by a motor whose rotation can be controlled in a stepless mode.

2. The injection molding machine according to claim 1, wherein the motor capable of controlling the rotation of said variable discharge pump in a stepless mode is one of an inverter controlled motor or an AC servomotor.

3. A control method for the injection molding machine according to claim 1 or 2, wherein a maximum load, which is flow rate times pressure, of said hydraulic actuator is controlled to match with a characteristic diagram in which flow rate times pressure of said variable discharge pump is constant.

4. A control method for the hydraulic actuating mechanism according to claim 1 or 2, wherein the discharge cutoff function includes a program control for operating a fluid pressure cutoff mechanism of said variable discharge pump by using a proportional pressure valve.

5. The injection molding machine according to claims 1 or 2, wherein two or more driving means including injection nozzle touching means, die clamping means, screw driving means, injecting means, and product ejecting means are driven hydraulically by using the hydraulic actuating mechanism and other driving means are driven electrically.

6. A control method for the injection molding machine according to claim 5, wherein a maximum load, which is flow rate times pressure, of said hydraulic actuator is controlled so as to match with a characteristic diagram in which flow rate times pressure of said variable discharge pump is constant.

7. A control method for the injection molding machine according to claim 5, wherein the discharge cutoff function includes a program control for operating a fluid pressure cutoff mechanism of said variable discharge pump by using a proportional pressure valve.

8. The injection molding machine according to claim 5, wherein said die opening/closing device, injector, and screw driving are driven electrically.

9. The injection molding machine according to claim 5, wherein said die opening/closing means, injecting means, and screw driving means are driven electrically.

10. A control method for the injection molding machine according to claim 9, wherein a maximum load, which is flow rate times pressure, of said hydraulic actuator is controlled so as to match with a characteristic diagram in which flow rate times pressure of said variable discharge pump is constant.

11. A control method for the injection molding machine according to claim 9, wherein the discharge cutoff function includes a program control for operating a fluid pressure cutoff mechanism of said variable discharge pump by using a proportional pressure valve.

12. The injection molding machine according to claim 1, wherein at least two driving devices including an injection nozzle touching device, a die clamp, a screw driver, a injector, and a product ejector are driven hydraulically by using said hydraulic actuating mechanism, and other driving devices are driven electrically.

13. An injection molding machine including a hydraulic actuating mechanism, the injection molding machine comprising:

an electrically-driven injector;

a plurality of hydraulic actuators driven by one hydraulic pump, the hydraulic pump of said hydraulic actuating mechanism being a variable discharge pump configured to deliver a maximum necessary delivery capacity at least for each of said hydraulic actuators at the time of a highest rotational speed of said pump; and a plurality of four-way switching valves and at least one two-way switching valve provided between the variable discharge pump and said plurality of hydraulic actuators, the plurality of four-way switching valves and the at least one two-way switching valve being configured to control an operation of the plurality of hydraulic actuators, wherein the plurality of hydraulic actuators includes a hydraulically-driven die clamp, a discharged fluid pressure is controlled by a discharge cutoff function of a pressure compensator ancillary to said variable discharge pump, and said pump is driven by a motor whose rotation can be controlled in a stepless mode.

* * * * *